March 9, 1965 F. F. FISHER 3,172,267
PORTABLE PROTECTIVE FLOOD BARRIER
Filed Jan. 30, 1961
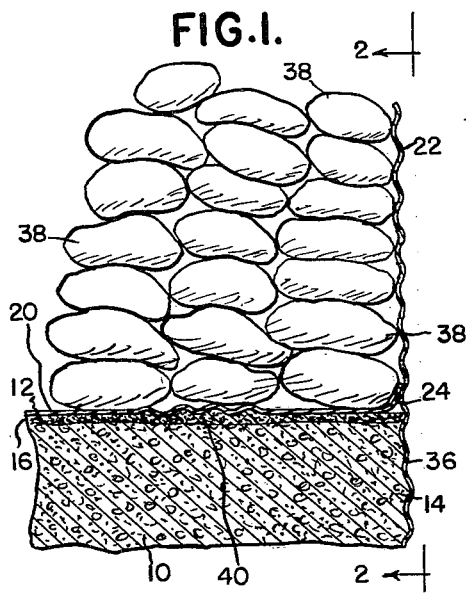
FIG.1.
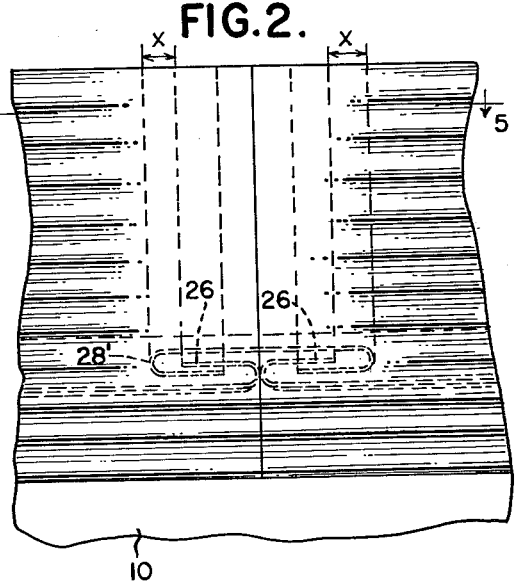
FIG.2.
FIG.3.
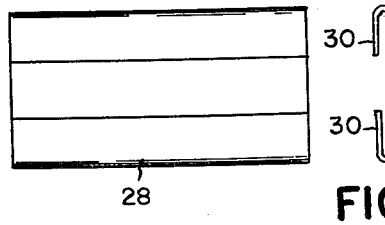
FIG.4.
FIG.5.
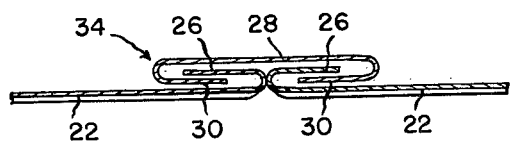
FIG.6.
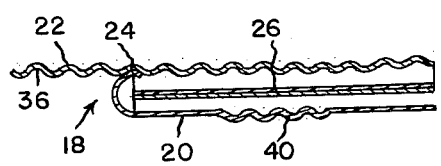
INVENTOR.
FRANK F. FISHER
BY Whittemore, Hulbert & Belknap
ATTORNEYS United States Patent Office 3,172,267
Patented Mar. 9, 1965

3,172,267
PORTABLE PROTECTIVE FLOOD BARRIER
Frank F. Fisher, 14111 Sussex, Detroit, Mich.
Filed Jan. 30, 1961, Ser. No. 85,525
3 Claims. (Cl. 61—37)

This invention relates to a protective flood barrier which is adapted to be placed on a levee for preventing floor waters from overflowing, and relates more specifically to a protective flood barrier which is portable.

In the past, when floods have threatened a certain area, men have generally placed handbags on the levee, working feverously in order to save the surrounding countryside from a threatened inundation. This procedure or method of holding back the flood waters is a rather primitive procedure and as a result does not provide the positive protection required. The sandbags are generally placed on the levee in a hurry when an emergency situation is present, resulting in an expensive and an arduous job. With the prior art method, unfortunately, the flood waters at times gain on the workmen or the piled-up sandbags give way as a result of careless construction, an excess of local water pressure on the bags or due to the erosive action of the raging flood waters.

It is an object of the present invention to provide an improved structure for preventing flooding, which produces positive results and is adapted to be mounted on the levee in less time and with a smaller amount of labor than required previously.

Another object of the present invention is to provide a protective flood barrier which is adapted to be mounted on a levee comprising a series of right angle sections, each section having a vertical and a horizontal supporting wall, means for interconnecting the adjacent sections and a relatively heavy mass of material judiciously placed on top of the horizontal supporting walls to hold said horizontal supporting walls in place on top of the levee and to provide lateral support for said vertical supporting wall when subjected to the pressure of the water.

Still another object of the present invention is to provide a portable protective flood barrier comprising a series of sections of sheet metal material, each section including a vertically extending wall and a horizontally extending supporting wall which is adapted to lie on top of the levee, said horizontally extending supporting wall being flexibly connected at one end thereof to the inner side of said vertically extending wall, removable interlocking means connecting the adjacent edges of said walls, and a relatively heavy mass of removable material judiciously placed on top of the horizontally extending supporting walls to hold said supporting walls in place on top of the levee and to provide lateral support for said vertically extending wall when subjected to the pressure of the water.

A further object of the present invention is to provide a portable protective flood barrier comprising a series of sections, each section including a vertically extending wall and a horizontally extending supporting wall which is adapted to lie on top of the levee, said vertically extending wall being made from corrugated sheet metal, said horizontally extending supporting wall being made from sheet metal and including an intermediate corrugated sealing portion, means providing a flexible connection between an end of said supporting wall and said vertically extending wall, the last-mentioned wall including a wall portion which extends below the top of the levee and abuts the front wall thereof, removable interlocking means connecting the adjacent edges of said walls, and a relatively heavy mass of removable material judiciously placed on top of the horizontally extending supporting walls to hold said supporting walls in place on top of the levee and to provide lateral support for said vertically extending wall when subjected to the pressure of the water.

It is thus another object of this invention to provide a simplified low cost structure of the aforementioned type having certain advantages contributing to efficiency, reliability and long life as well as ease of maintenance.

Other objects and features of the invention will become apparent as the description proceeds, especially when taken in conjunction with the accompanying drawing, illustrating a preferred embodiment of the invention, wherein:

FIGURE 1 is a vertical sectional view taken on a plane through the portable protective flood barrier.

FIGURE 2 is a front elevation looking in the direction of arrows 2—2 of FIGURE 1.

FIGURE 3 is a plan view of the connector.

FIGURE 4 is a right hand end view of the connector shown in FIGURE 3.

FIGURE 5 is a sectional view taken on line 5—5 of FIGURE 2.

FIGURE 6 is a sectional view of the vertical and horizontal walls when in a folded position prior to erection.

The levee is represented in FIGURE 1 by the numeral 10 and includes an upper surface 12 and a front wall 14 facing the water. The upper surface 12 of the levee 10 is normally of irregular shape and therefore, surface 12 may be leveled in various ways such as placing a layer of sand or other compressible material 16 on the levee surface 12.

A series of foldable sections 18, as shown in FIGURE 6, is adapted to be mounted on the levee 10 and interlocked together to form a protective flood barrier which extends longitudinally of the levee 10. Each section 18 includes a horizontally extending wall or leg 20 and a vertically extending wall or leg 22 which faces the water. An end of the wall 20 is spot welded to the inner surface of the vertical wall 22 so as to provide a flexible connection 24 between walls 20 and 22.

The sections 18 are prefabricated and stored at convenient points for quick delivery to threatened areas. The flexible connection 24 facilitates handling, storing, shipping, as well as ease of assembly. Thus, each section 18 can be easily handled and opened like a book. When assembling the sections 18 into the protective flood barrier, the folded sections 18 are placed adjacent one another and interconnected while lying flat on the levee 10. After the sections 18 are connected in a manner to be subsequently described, the connection 24 flexes sufficiently to allow the walls 22 to be moved with reference to the walls 20 to a position which has an included angle therebetween in the amount of 90°.

The walls 20 and 22 each have their longitudinal edges turned rearwardly or offset to provide hooks or flanges 26. A connector or drive strip 28 of C-shaped cross-section has a pair of arms 30. A vertical connector 28 is adapted to be longitudinally slid over the hooks 26 to maintain the adjacent walls 22 together. A horizontal connector 28' of C-shaped cross-section is adapted to be slid over the pair of adjacent flanges 26 provided on a pair of adjacent walls or members 20.

The joint 34 between adjacent walls 22 (or walls 20) must provide limited misalignment, both vertical and horizontal, as well as up and down. Therefore, the connector 28 or connector 28' is made to provide a loose fit with the hooks 26. This construction permits any angular misalignment necessitated by the contour of the surface 12 within the limits indicated by lines X in FIGURE 2. The joint 34 permits assembly between adjacent walls toward the right or left, and simultaneously on as many starting points as the conditions of the levee may dictate. This end construction also permits an overlapping of sections with a minimum amount of cutting or trimming.

Each vertical wall 22 includes a wall portion 36 which extends below the wall 20 and is adapted to abut the front wall 14 of the levee 10 when in an assembled position. The wall portion 36 may be an integral part of the vertical wall 22 as shown, or a separate extension as wall 20. The wall portion 36 extends below the wall 20 in order to protect the levee's top and the sandbag foundation to be subsequently described.

After the sections 18 have been appropriately connected by the connectors 28, the walls 20 and 22 are moved into the position shown in FIGURE 1. A relatively heavy mass of material, such as sandbags 38, is judiciously placed on top of the horizontal supporting walls 20 to hold the walls in a fixed position on the levee 10. In addition, the sandbags 38 are arranged so as to provide lateral support for the vertically extending walls 22 when subjected to the pressure of the water.

Although sandbags 38 have been shown, it should be understood that other heavy material may be used such as large rocks, gravel bags, etc. to accomplish the same objective of providing a strong foundation.

The walls 20 and 22 are made from sheet metal. The vertical or front wall 22 is made from commercially available 24-gauge corrugated sheet metal such as the type having 1½ inch corrugations extending the full length thereof. As an example, the size of the wall 22 may be 4 feet in width by 10 feet in length. The 1½ inch corrugations distribute the pressure exerted by the flood waters over a large number of sandbags 38, as well as to protect the sandbag foundation against the flood's erosive action.

The wall 20 is made from 26-gauge sheet metal material having a width of 4 feet and a length of 3 to 5 feet. Each wall 20 has an embossed or corrguated portion 40 similar to ½ inch corrugations which extend the full width of the wall 20. The corrugated portion 40 is located at an intermediate part of the wall 20 and tends to seal off any leakage between the wall 20 and the top surface 12 of the levee 10. The embossed portion 40 is approximately one foot wide.

As the ends of the assembled sections 18 interlock, a fairly water-tight enclosure is formed as soon as the walls 20 are weighted down by the sandbags 38.

If it is desired to provide a permanent flood protecting barrier, the sandbags 38 are placed on the walls 20 in the manner just described. The walls 20 and 22 double as a handy, ready-made concrete form. In addition, concrete is poured in and around the sandbags 38 so as to completely fill the voids therebetween. Such a construction provides a strong and permanent flood barrier.

The drawing and the foregoing specification constitute a description of the improved portable protective flood barrier in such full, clear, concise and exact terms as to enable any person skilled in the art to practice the invention, the scope of which is indicated by the appended claims.

What I claim as my invention is:

1. A portable protective flood barrier comprising a series of sections which are arranged side by side on top of a levee, each section consisting of a pair of members made from sheet material provided with corrugations, flexible means for interconnecting the members of each section for relative angular movement from a folded position where the members are arranged substantially parallel to and adjacent each other to an erected position where one of said members is substantially vertical and the other of said members is substantially horizontal so as to lie on top of the levee, the edge of said horizontal member closest to said vertical member dividing said vertical member into upper and lower portions, the vertical edges of each vertical member being provided with oppositely turned flanges which are spaced inwardly from the inner surface of and arranged parallel to said vertical member, a removable interlocking drive strip of C-shaped cross-section connecting the flanges provided on the adjacent vertical edges of each adjacent pair of vertical members, said drive strip comprising a base and a pair of oppositely turned continuous edge portions extending parallel to said base, said drive strip having a predetermined amount of edgewise play between the edge portions of said drive strip and said adjacent vertical flanges to compensate for misalignment between said sections due to the contour of the top of the levee, the horizontal edges of each of said horizontal members which are substantially perpendicular to said vertical members being provided with oppositely turned flanges which are spaced upwardly from the upper surface of and arranged parallel to said horizontal member, a removable interlocking drive strip of C-shaped cross-section connecting the flanges provided on the adjacent edges of each pair of adjacent horizontal members, said last mentioned drive strip comprising a base and a pair of arms, said last mentioned drive strip having a predetermined amount of edgewise play between the arms of said last mentioned drive strip and said last mentioned flanges to compensate for misalignment between said sections, and a relatively heavy mass of removable material judiciously placed on top of the horizontal members and abutting the inner surfaces of said vertical members to hold said vertical and horizontal members in a predetermined position on top of the levee and to provide lateral support for said vertical members when subjected to the pressure of the water on the outer surfaces thereof, the lower portions of said vertical members extending below the top of the levee and abutting the front wall of the levee to protect the front wall from the erosive action of the water.

2. The portable protective flood barrier defined in claim 1 wherein said material is effective to urge the base of each vertical drive strip firmly against the corresponding flanges to substantially close any space between said vertical members to prevent water from leaking therethrough.

3. The portable protective flood barrier defined in claim 1 wherein said relatively heavy mass of removable material comprises a plurality of sandbags.

References Cited in the file of this patent

UNITED STATES PATENTS

| | | |
|---|---|---|
| 245,473 | Follet | Aug. 9, 1881 |
| 314,941 | Hyatt | Mar. 31, 1885 |
| 629,028 | Cudner | July 18, 1899 |
| 1,521,069 | Bern | Dec. 30, 1924 |
| 2,184,904 | Bohme | Dec. 26, 1939 |
| 2,315,351 | Schaefer | Mar. 30, 1943 |
| 2,388,624 | Tashjian | Nov. 6, 1945 |
| 2,877,600 | Slate | Mar. 17, 1959 |

FOREIGN PATENTS

| | | |
|---|---|---|
| 470,998 | France | June 30, 1914 |